United States Patent
Shin et al.

(10) Patent No.: US 12,047,548 B2
(45) Date of Patent: Jul. 23, 2024

(54) METHOD AND APPARATUS FOR HANDLING EMERGENCY SITUATION IN VEHICLE

(71) Applicant: LG ELECTRONICS INC., Seoul (KR)

(72) Inventors: Jeongeun Shin, Seoul (KR); Junghee Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 17/906,963

(22) PCT Filed: Apr. 23, 2020

(86) PCT No.: PCT/KR2020/005344
§ 371 (c)(1),
(2) Date: Sep. 21, 2022

(87) PCT Pub. No.: WO2021/215558
PCT Pub. Date: Oct. 28, 2021

(65) Prior Publication Data
US 2023/0115478 A1   Apr. 13, 2023

(51) Int. Cl.
*H04N 13/194* (2018.01)
*H04N 7/18* (2006.01)
*H04N 13/128* (2018.01)
*H04N 13/161* (2018.01)
*H04N 13/243* (2018.01)
*H04N 13/271* (2018.01)

(52) U.S. Cl.
CPC ......... *H04N 13/194* (2018.05); *H04N 7/181* (2013.01); *H04N 13/128* (2018.05); *H04N 13/161* (2018.05); *H04N 13/243* (2018.05); *H04N 13/271* (2018.05)

(58) Field of Classification Search
None
See application file for complete search history.

(56) References Cited

U.S. PATENT DOCUMENTS

2016/0357187 A1* 12/2016 Ansari .................. G06T 19/20

FOREIGN PATENT DOCUMENTS

| JP | 2019018852 | 2/2019 |
|---|---|---|
| KR | 1020180019309 | 2/2018 |
| KR | 1020190041328 | 4/2019 |
| KR | 1020190072235 | 6/2019 |
| KR | 102024914 | 11/2019 |

OTHER PUBLICATIONS

PCT International Application No. PCT/KR2020/005344, International Search Report dated Jan. 20, 2021, 2 pages.

* cited by examiner

Primary Examiner — Christopher Braniff
(74) Attorney, Agent, or Firm — LEE, HONG, DEGERMAN, KANG & WAIMEY

(57) ABSTRACT

An apparatus for handling an emergency situation in a vehicle comprises: a control device; and a camera system that provides a 3D video of the interior of the vehicle. The control device transmits, to a mobile edge computing (MEC) server, information about a camera parameter set related to the camera system while the vehicle is driving. When an emergency event related to the vehicle is detected, the control device transmits, to the MEC server, a 3D video encoded on the basis of the camera parameter set.

14 Claims, 13 Drawing Sheets

METHOD AND APPARATUS FOR HANDLING EMERGENCY SITUATION IN VEHICLE

CROSS-REFERENCE TO RELATED APPLICATION(S)

This application is the National Stage filing under 35 U.S.C. 371 of International Application No. PCT/KR2020/005344, filed on Apr. 23, 2020, the contents of which are all incorporated by reference herein in its entirety.

BACKGROUND OF THE DISCLOSURE

Field

The present disclosure relates to a method for handling an emergency situation in a vehicle wireless communication device for a vehicle, and a device using the method.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is a communication standard protocol based on IEEE 802.11. The Long Term Evolution (LTE) and New Radio (NR) of the 3GPP also provide the communication protocol for the V2X.

In addition to the V2X, partially or fully autonomous vehicles are emerging. This autonomous vehicle needs to exchange more data with neighbor vehicles, pedestrians, servers, and the like with low latency and high reliability.

An emergency situation may occur while the vehicle is driving. U.S. Pat. No. 6,377,165 discloses a method of delivering vehicle location information to an emergency center in case of an emergency.

SUMMARY OF THE DISCLOSURE

The present disclosure provides a method for handling an emergency situation in a vehicle wireless communication device for a vehicle, and a device using the method.

In an aspect, a device for handling an emergency situation in a vehicle includes a control device mounted on the vehicle, and a camera system for providing a 3D video regarding an interior of the vehicle to the control device and comprising a plurality of 3D camera devices, each of the plurality of 3D camera devices including a plurality of camera. The control device is configured to transmit, to a Mobile Edge Computing (MEC) server, information about a camera parameter set for the camera system while the vehicle is driving, and, when an emergency event related to the vehicle is detected, transmit, to the MEC server, the detection of the emergency event and a 3D video encoded based on the camera parameter set provided by the camera system.

In another aspect, a method for handling an emergency situation in a vehicle is provided. The method performed by a control device of the vehicle includes transmitting, to a Mobile Edge Computing (MEC) server, information about a camera parameter set for a camera system while the vehicle is driving, the camera system for providing a 3D video regarding an interior of the vehicle to the control device and comprising a plurality of 3D camera devices, each of the plurality of 3D camera devices including a plurality of camera, and, when an emergency event related to the vehicle is detected, transmitting, to the MEC server, the detection of the emergency event and a 3D video encoded based on the camera parameter set provided by the camera system.

When an emergency event occurs in the vehicle, it is possible to reduce the delay in the transmission of 3D video between the server and the vehicle.

DETAILED DESCRIPTION OF THE EMBODIMENTS

Figure 1:
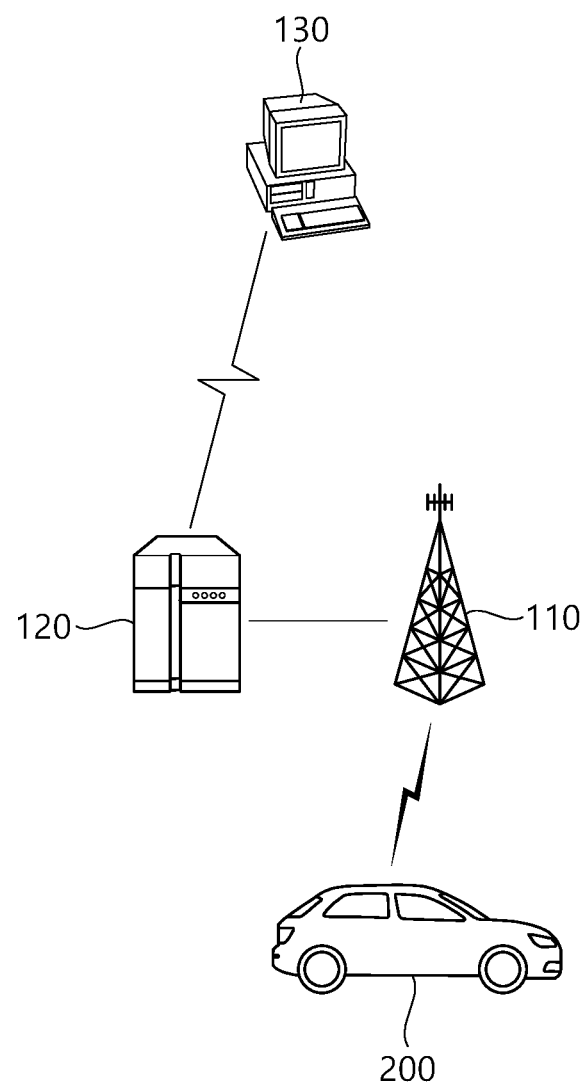
FIG. 1 illustrates a system to which an embodiment is applied.

Hereinafter, embodiments disclosed in the present disclosure will be described in detail with reference to the accompanying drawings, and the same or like components are denoted by the same reference numerals regardless of the reference numerals, and redundant description thereof will be omitted. The suffixes "module" and "unit" for the components used in the following description are given or mixed in consideration of ease of writing the disclosure, and do not have distinct meanings or roles in itself. In addition, in the description of the embodiments disclosed in the present disclosure, if it is determined that the detailed description of the related known technology may obscure the subject matter of the embodiments disclosed in the present disclosure, the detailed description thereof will be omitted. In addition, the accompanying drawings are intended merely for facilitating understanding of the embodiments disclosed in the present disclosure, and the technical subject matters disclosed in the present disclosure is not limited by the accompanying drawings.

Terms including ordinal numbers such as first and second may be used to describe various components, but the components are not limited by the terms. The terms are used only for the purpose of distinguishing one component from another component.

When a component is said to be "connected" or "coupled" to another component, it may be directly connected to or coupled to another component, but it should be understood that other components may exist therebetween. On the other hand, when a component is said to be "directly connected" or "directly coupled" to another component, it should be understood that there exist no other components therebetween.

Singular expressions include plural expressions unless the context clearly indicates otherwise.

In the present application, it should be understood that the term "comprises", "having", or the like is intended to indicate that there exists a feature, a number, a step, an operation, a component, a part, or combination thereof described in the disclosure, and does not exclude the possibility of the presence or the addition of one or more other features, numbers, steps, operations, components, parts, or a combination thereof in advance.

In the following description, the left of the vehicle means the left of the forward driving direction of the vehicle, and the right of the vehicle means the right of the forward driving direction of the vehicle.

FIG. 1 illustrates a system to which an embodiment is applied.

A base station 110 may communicate with a vehicle 200 or other base stations using various wireless communication protocols. The base station generally refers to a fixed station that communicates with a mobile device and/or the vehicle 200, and may be called as other terms such as an evolved-NodeB (eNB), gNB, Base Transceiver System (BTS), Access Point, roadside unit (RSU), etc. The wireless communication protocol has no limitations, and may include, for example, Dedicated Short Range Communications (DSRC) or WiFi based on the Institute of Electrical and Electronics Engineers (IEEE) 802.11, C-V2X and/or cellular communications based on the 3rd Generation Partnership Project (3GPP) (for example, Wideband Code Division Multiple Access (WCDMA), Long Term Evolution (LTE), New Radio (NR), and the like).

A server 120 is connected to one or more base stations 110 and includes computing hardware that provides driving data service to the vehicle 200. The server 120 may store map data and driving environment information, and provide them to the vehicle 200. In order to provide low latency, the server 120 may be a Mobile Edge Computing (MEC) server installed adjacent to the base station 110. The server 120 is connected to an emergency center 130 through a wired network.

The operator of the emergency center 130 may detect whether an emergency event occurs at the vehicle 200 and contact an emergency responder. The emergency responder may include a police station, an ambulance, and the like.

The vehicle 200 may communicate with the base station 110 and/or surrounding vehicles using a wireless communication protocol. The vehicle 200 according to the embodiment of the present specification is defined as a transportation means traveling on a road or track. The vehicle 200 may include a car, a train, and a motorcycle. The vehicle 200 may include an internal combustion engine vehicle having an engine as a power source, a hybrid vehicle having an engine and an electric motor as a power source, an electric vehicle having an electric motor as a power source, etc. The vehicle 200 may be a vehicle owned by an individual. The vehicle 200 may be a shared vehicle. The vehicle 200 may be an autonomous driving vehicle.

The vehicle 200 may be configured to operate autonomously. The autonomous driving refers to, for example, driving without the assistance of a human driver. In the autonomous driving mode, the vehicle 200 may be configured to detect the neighbor vehicle 130 and determine the trajectory of the detected vehicle. The vehicle 200 may exchange information by communicating with the neighbor vehicle 130.

The vehicle 200 may perform a switching operation from the autonomous driving mode to the manual driving mode or a switching operation from the manual driving mode to the autonomous driving mode. For example, the vehicle 200 may change the mode of the vehicle 10 from the autonomous driving mode to the manual driving mode or from the manual driving mode to the autonomous driving mode based on a signal received from the user interface device.

At least one Advanced Driver Assistance System (ADAS) function may be supported in manual driving or autonomous driving. ADAS may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), Adaptive High Beam Control (HBA), Auto Parking System (APS), Pedestrian Collision Warning System, Traffic Sign Recognition (TSR), Trafffic Sign Assist (TSA), Night Vision System, driver status monitoring (DSM) system, and Traffic Jam Assist system (TJA).

Figure 2:
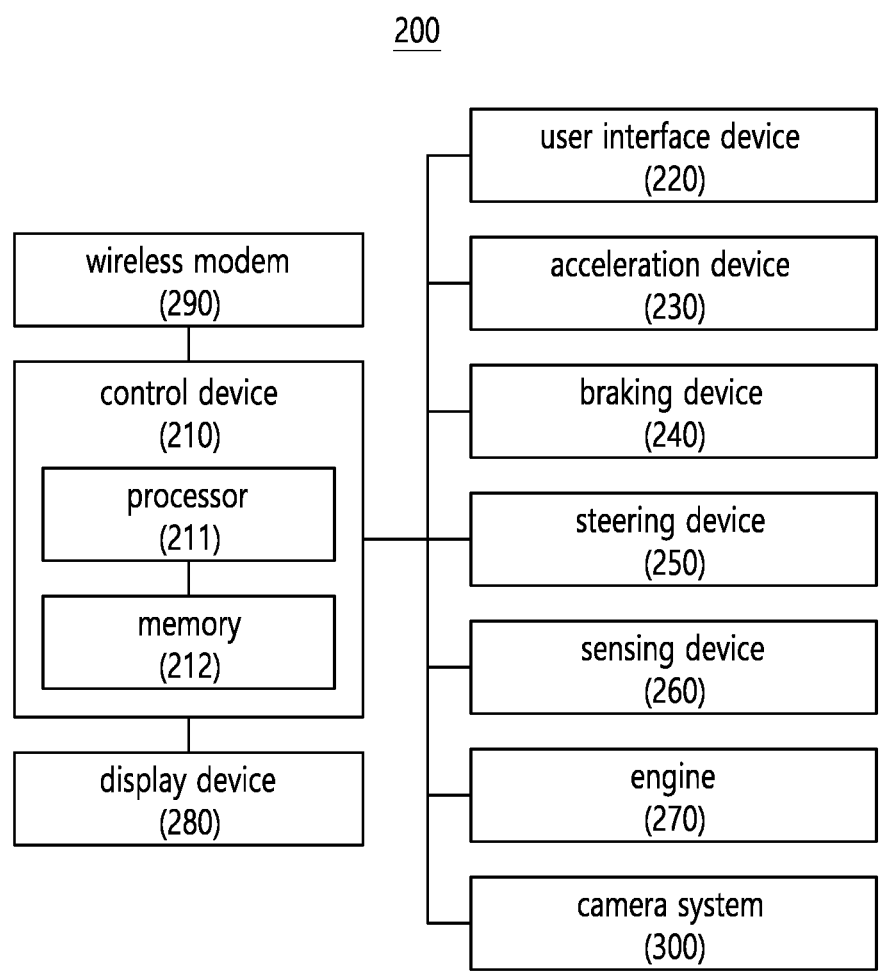
FIG. 2 is a block diagram illustrating a vehicle implementing the present embodiment.

FIG. 2 is a block diagram illustrating a vehicle implementing the present embodiment.

A vehicle 200 may include a control device 210, a user interface device 220, an acceleration device 230, a braking device 240, a steering device 250, a sensing device 260, an engine 270 and a camera system 300. The devices presented are only illustrative, and not all devices are essential. The vehicle 200 may further include additional devices, or specific devices may be omitted. Some of the devices may have their own processors, and perform processing related to the specific function of that device.

The user interface device 220 is a device for communicating between the vehicle 200 and a user. The user interface device 220 may receive a user input and provide information generated in the vehicle 200 to the user. The vehicle 200 may implement a user interface (UI) or a user experience (UX) through the user interface device 220. The user interface device 220 may include an input device, an output device, and a user monitoring device.

The acceleration device 230 may be a mechanism which is configured to accelerate the vehicle 200. The braking device 240 may be a mechanism which is configured to decelerate the vehicle 200. The steering device 250 may be a mechanism which is configured to adjust the direction of the vehicle 200. The vehicle 200 may accelerate through the acceleration device 230, decelerate through the braking device 240, and change a driving direction through the steering device 250. At least any one of the acceleration device 230, the braking device 240, and the steering device 250 may be controlled by the control device 210 and/or an additional controller in order to control the speed and direction of the vehicle 200.

The sensing device 260 may include one or more sensors configured to sense information regarding the location/speed of the vehicle 200 and/or the environment of the vehicle 200. The sensing device 260 may include a location data generating device for measuring a geographic location of the vehicle 200 and/or an object detecting device for recognizing an object around the vehicle 200.

The object detecting device may generate information about an object outside the vehicle 200. The information about the object may include at least one of the existence of the object, location information of the object, distance information between the vehicle 200 and the object, and relative speed information between the vehicle 200 and the object. The object detecting device may detect an object outside the vehicle 200. The object detecting device may include at least one sensor capable of detecting an object outside the vehicle 200. The object detecting device may include at least one of a camera, a radar, a lidar, an ultrasonic sensor, and an infrared sensor. The object detection device may provide data on an object generated based on a sensing signal generated by the sensor to at least one control device of the vehicle 200.

A camera may generate information about an object outside the vehicle 200 by using the image. The camera may include at least one lens, at least one image sensor, and at least one processor that is electrically connected to the image sensor to process a received signal, and generate data about the object based on the processed signal.

The camera may be at least one of a mono camera, a stereo camera, and an Around View Monitoring (AVM) camera. The camera may obtain position information of an object, distance information from an object, or relative speed information with an object by using various image processing algorithms. For example, the camera may acquire distance information and relative velocity information from an object based on a change in the size of the object over time from the acquired image. For example, the camera may acquire distance information and relative speed information from an object through a pinhole model, road surface profiling, or the like. For example, the camera may acquire distance information and relative velocity information from an object based on disparity information in a stereo image obtained from the stereo camera.

The camera may be mounted at a position where a field of view (FOV) can be secured in the vehicle in order to record the outside of the vehicle. The camera may be disposed adjacent to the front windshield in the interior of the vehicle to acquire an image of the front of the vehicle. The camera may be placed around the front bumper or radiator grill. The camera may be disposed adjacent to the rear glass in the interior of the vehicle to acquire an image of the rear of the vehicle. The camera may be placed around the rear bumper, trunk or tailgate. The camera may be disposed adjacent to at least one of the side windows in the interior of the vehicle in order to acquire an image of the side of the vehicle. Alternatively, the camera may be disposed around a side mirror, fender, or door.

The radar may generate information about an object outside the vehicle 200 using radio waves. The radar may include an electromagnetic wave transmitter, an electromagnetic wave receiver, and at least one processor that is electrically connected to the electromagnetic wave transmitter and the electromagnetic wave receiver, processes a received signal, and generates data for an object based on the processed signal. The radar may be implemented in a pulse radar method or a continuous wave radar method in terms of a radio wave emission principle. The radar may be implemented in a frequency modulated continuous wave (FMCW) method or a frequency shift keying (FSK) method according to a signal waveform among continuous wave radar methods. The radar may detect an object based on a time of flight (TOF) method or a phase-shift method using an electromagnetic wave as a medium, and determine the position of the detected object, the distance to the detected object, and the relative speed. The radar may be placed at a suitable location outside of the vehicle to detect objects located in front, rear or side of the vehicle.

The lidar may generate information about an object outside the vehicle 200 using laser light. The lidar may include a light transmitter, a light receiver and at least one processor that is electrically connected to the light transmitter and the light receiver, processes the received signal, and generates data about the object based on the processed signal. The lidar may be implemented in a time of flight (TOF) method or a phase-shift method. The lidar can be implemented as driven or non-driven. When implemented as a driving type, the lidar is rotated by a motor and may detect an object around the vehicle 200. When implemented as a non-driven type, the lidar may detect an object located within a predetermined range with respect to the vehicle by light steering. The vehicle 200 may include a plurality of non-driven lidar. The lidar may detect an object based on a time of flight (TOF) method or a phase-shift method with a laser light medium, and calculate the position of the detected object, the distance to the detected object, and the relative speed. The lidar may be placed at a suitable location outside of the vehicle to detect an object located in front, rear or side of the vehicle.

The location data generating device may generate location data of the vehicle 200. The location data generating device may include at least one of a Global Positioning System (GPS) and a Differential Global Positioning System (DGPS). The location data generating device may generate location data of the vehicle 200 based on a signal generated by at least one of GPS and DGPS. According to an embodiment, the location data generating device may correct location data based on at least one of an Inertial Measurement Unit (IMU) of the sensing device 260 and a camera of the object detecting device. The location data generating devices may be referred to as a Global Navigation Satellite System (GNSS).

The sensing device 260 may include a state sensor which is set to sense a state of the vehicle 200. The state sensor may include at least any one of an inertial navigation unit (IMU) sensor, a collision sensor, a wheel sensor, a speed sensor, a tilt sensor, a weight sensing sensor, a heading sensor, a position module, a vehicle forward/backward sensor, a battery sensor, a fuel sensor, a tire sensor, a steering sensor, temperature sensor, a humidity sensor, an ultrasonic sensor, an illumination sensor, and an accelerator pedal position sensor.

The sensing device 260 may generate state data of the vehicle based on a signal generated by at least one sensor. The vehicle state data may be information generated based on data sensed by various sensors inside the vehicle. The sensing device 260 may generate vehicle posture data, vehicle motion data, vehicle yaw data, vehicle roll data, vehicle pitch data, vehicle collision data, vehicle direction data, vehicle angle data, vehicle speed data, vehicle acceleration data, vehicle tilt data, vehicle forward/backward data, vehicle weight data, battery data, fuel data, tire data, vehicle interior temperature data, vehicle interior humidity data, steering wheel rotation angle data, vehicle exterior illumination data, pressure data applied to the accelerator pedal, pressure data applied to the brake pedal, and the like.

The sensing device 260 may include an emergency condition sensor for detecting an emergency event of the vehicle 200. The emergency condition sensor may include, but is not limited to, an air bag deployment sensor, a vehicle impact sensor, a seat impact sensor, and the like.

The engine 270 provides propulsion to the vehicle 200. The engine 270 may include an internal combustion engine, an electric motor, or a combination thereof.

The control device 210 may exchange various information by communicating with the user interface device 220, the acceleration device 230, the braking device 240, the steering device 250, and the sensing device 260, or control these devices.

The control device 210 may include a processor 211 and a memory 212. The control device 210 may include one or more sub-devices based on the function, and each sub-device may include at least one of a processor and a memory, and may be configured to perform processing related to the function of the corresponding sub-device. For example, the control device 210 may include a telematics control unit (TCU) which is responsible for communication between the interior and the exterior of the vehicle 200.

The control device 210 may include an autonomous driving device which is responsible for autonomous driving. The control device 210 may include an infotainment system or an Audio Video Navigation (AVN) system which displays driving information to passengers or provides various entertainments. According to the following embodiments, the control device 210 may include the TCU or the infotainment system. Alternatively, the control device 210 may also include a combination of the TCU and the infotainment system or a combination of other functions.

The control device 210 for autonomous driving may generate a path for autonomous driving based on the obtained data. The control device 210 may generate a driving plan for driving along the generated path. The control device 210 may generate a signal for controlling the movement of the vehicle according to the driving plan. The autonomous driving device 210 may provide the generated signal to the accelerator 230, the brake device 240, the steering device 250, and the engine 270.

The processor 211 may include an application-specific integrated circuit (ASIC), a central processing unit (CPU), an application processor (AP), digital signal processors (DSPs), digital signal processing devices (DSPDs), programmable logic devices (PLDs), field programmable gate arrays (FPGAs), a microcontroller, a chipset, a logic circuit, a data processing device, and/or a combination thereof. In the software implementation for the following embodiments, a software code which performs the functions described herein may be stored in the memory 212 and processed by the processor 211.

The memory 212 may store information which is accessible by the processor 211. The information may include instructions which are executable by the processor 211 and/or data which are processed by the processor. The memory 212 may include any form of computer-readable medium which operates to store information. For example, the memory 212 may include a read only memory (ROM), a random access memory (RAM), a digital video disc (DVD), an optical disc, a flash memory, a Solid State Drive (SSD), a hard drive, and a combination thereof.

Although the control device 210 is described to include the processor and the memory in one physical block, the control device 210 may include a plurality of processors and a plurality of memories, and may be physically or logically, operatively connected.

The control device 210 may be connected to a display device 280 configured to display information. The display device 280 may include a liquid crystal display (LCD) touch screen or an Organic Light Emitting Diode (OLED) touch screen, and include various sensors (a video camera, a microphone, and the like) configured to detect a passenger's state or gesture.

The control device 210 may be connected to a wireless modem 290 which is set to communicate with other devices via a wireless medium. The control device 210 may exchange radio signals with mobile devices of the interior/exterior of the vehicle 200, a server 120 (see FIG. 1) or the surrounding vehicle through the wireless modem 290. There are no limitations to the wireless communication protocol which is supported by the wireless modem 290, and the wireless modem 290 may support various wireless communication protocols such as cellular communication, WiFi, BLUETOOTH, ZIGBEE, an infrared link, and the like.

The memory 212 of the control device 210 may have map information and/or driving plan data. The driving plan data may include information on a vehicle trajectory for the vehicle 200 to track the location of the vehicle from the current location to the destination. The driving plan data may be used to guide the trajectory to the driver, or for autonomous driving. The map information may include various maps configured to define the driving environment. The map information may include the shape and elevation of a roadway, a lane line, an intersection, a crosswalk, a speed limit, a traffic signal, buildings, or other objects or information. The map information may further include real-time traffic information, obstructions on the roadway, roadway state information, and the like. The map information and the driving plan data may be updated based on the information which is given by the server 120, or updated based on the information which is detected by the sensing device 260 of the vehicle 200.

The control device 210 may generate electronic horizon Data. The electronic horizon data may be understood as driving plan data within a range from a point where the vehicle 200 is located to a horizon. The horizon may be understood as a point in front of a preset distance from a point where the vehicle 200 is located based on a preset driving path. The horizon may mean a point to which the vehicle 200 can reach after a predetermined time from a point where the vehicle 200 is located along a preset driving path.

The camera system 300 monitors the inside and outside of the vehicle 200 to capture an image or record a video. The camera of the sensing device 260 is generally used to detect objects around the vehicle 200, but the camera system 300 is used to monitor the interior and exterior conditions of the vehicle 200. The camera system 300 has a plurality of 3D cameras and supports 3D images and 3D videos.

Figure 3:
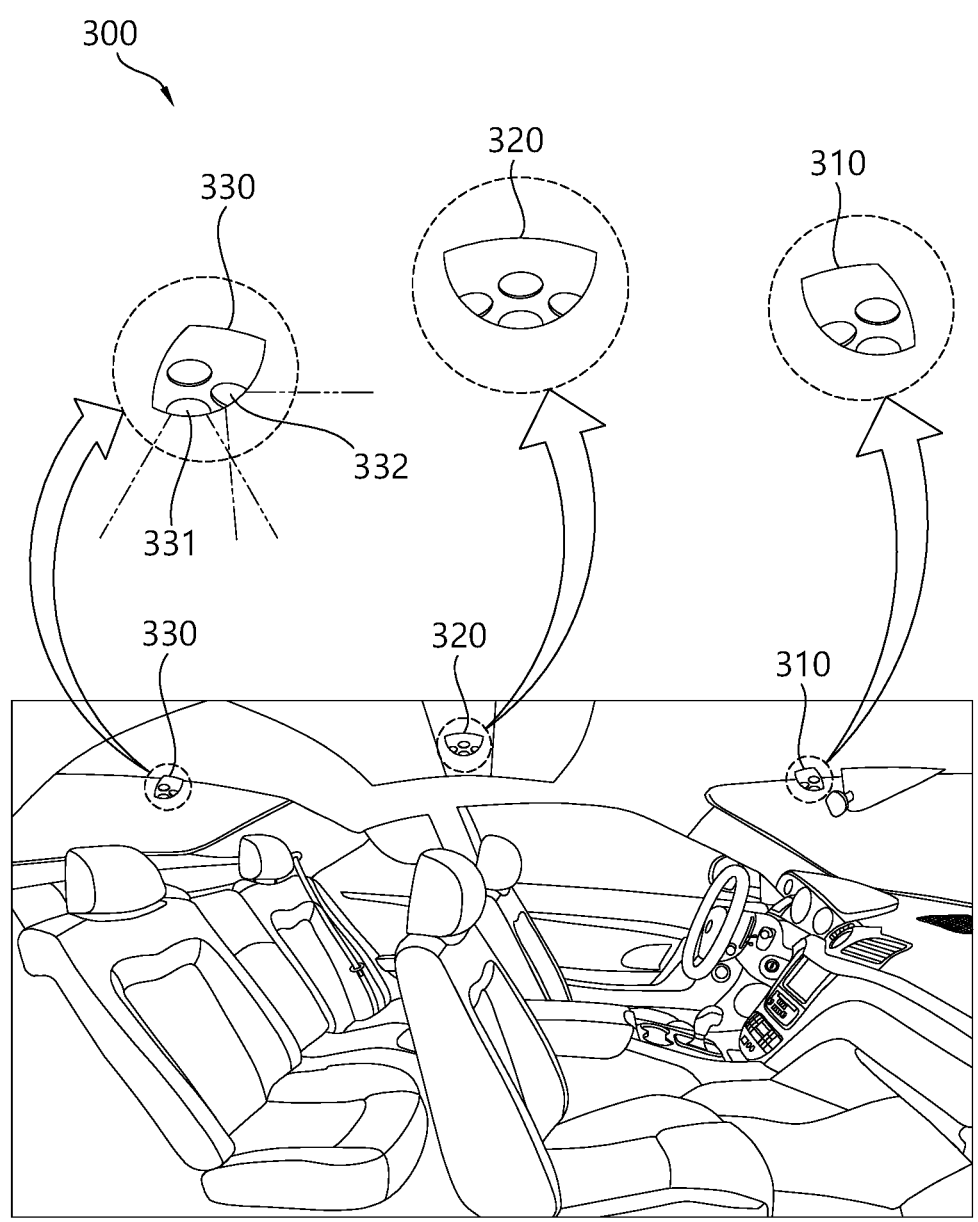
FIG. 3 shows an example of a camera system having a plurality of 3D cameras inside a vehicle.

FIG. 3 shows an example of a camera system having a plurality of 3D cameras inside a vehicle.

A camera system 300 includes a front 3D camera device 310 disposed in front of the vehicle, a middle 3D camera device 320 disposed in the middle of the vehicle, and a rear 3D camera device 330 disposed at the rear of the vehicle. The camera system 300 is used for capturing an image of the inside of the vehicle, and the front 3D camera device 310, the middle 3D camera device 320 and the rear 3D camera device 330 are all oriented to have a view about the inside of the vehicle.

Each 3D camera device includes a housing and a plurality of cameras mounted to the housing. A camera may include one or more lenses and an image sensor. Each 3D camera device is shown to have a spherical housing, but this is only an example. Each camera in the 3D camera device is in a fixed position. To form a stereoscopic field of view (FOV)

for capturing 3D images, each camera in the 3D camera device has a FOV that overlaps with that of at least one surrounding camera. For example, a first camera 331 of the rear 3D camera device 330 has an overlapping FOV with a second camera 332.

Cameras of different 3D camera devices may also have overlapping FOVs. For example, a first camera of the front 3D camera device 310 and a second camera of the middle 3D camera device 320 may have an overlapping FOV.

According to the embodiment of FIG. 3, it is shown that the camera system 300 includes one 3D camera device in the front, middle, and rear of the vehicle, but this is only an example. 3D camera devices may be deployed in a variety of ways to capture one or more 3D images of passengers, objects, or interior status in a vehicle.

Figure 4:
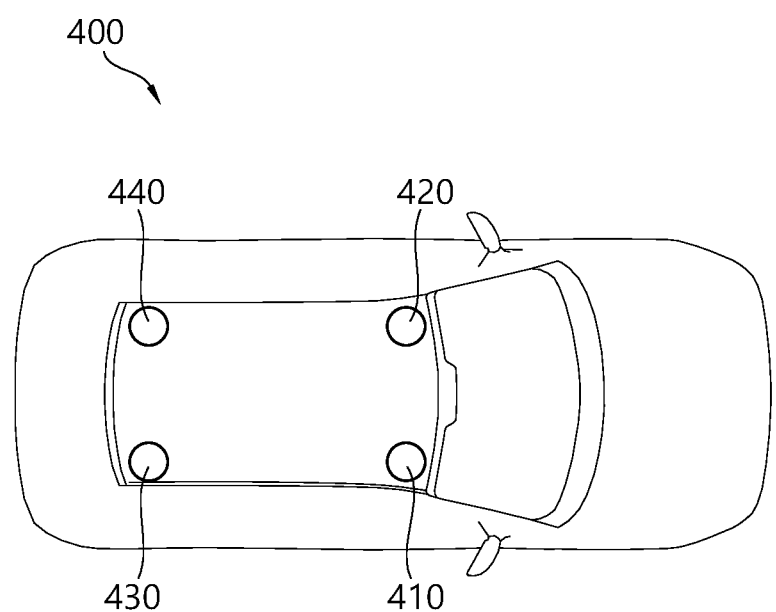
FIG. 4 shows another example of a camera system for capturing an image inside a vehicle.
Figure 4:
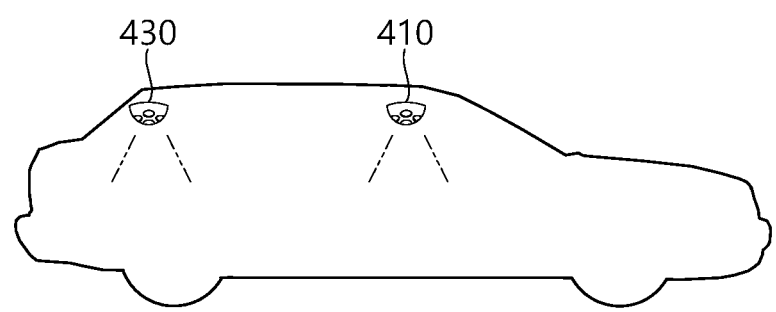

FIG. 4 shows another example of a camera system for capturing an image inside a vehicle. A camera system 400 includes four 3D camera devices 410, 420, 430 and 440 that are respectively disposed on the upper corners of the vehicle to generate 3D images of the interior of the vehicle.

The number or position of 3D camera devices in the camera system may be variously modified to generate 3D images of the interior and/or exterior of the vehicle.

Figure 5:
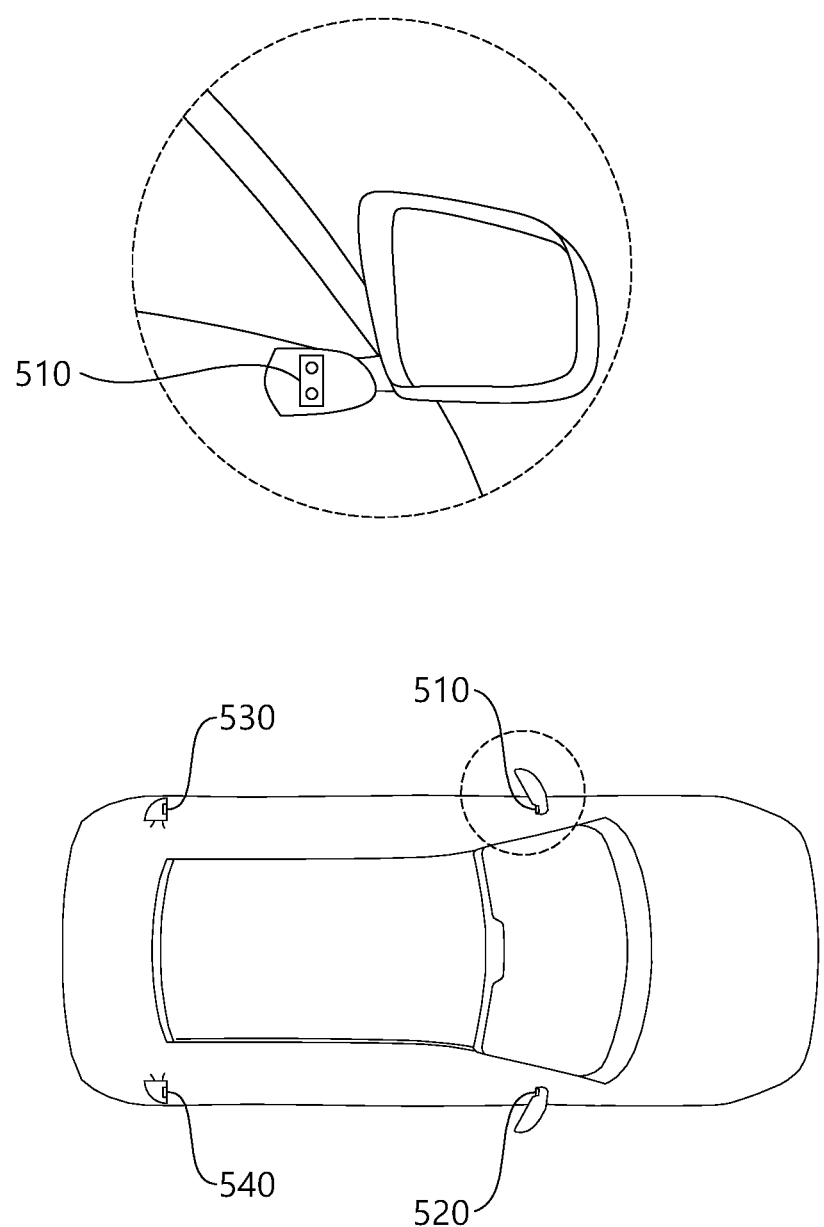
FIG. 5 shows another example of a camera system for capturing an image outside the vehicle.

FIG. 5 shows another example of a camera system for capturing an image outside the vehicle.

A camera system 500 may capture a 3D image of the interior of the vehicle as well as a 3D image of the exterior of the vehicle. The camera system 500 may include two 3D camera devices 510 and 520 on the left and right in front of the vehicle and two 3D cameras 530 and 540 on the left of the rear of the vehicle. The 3D camera devices 510 and 520 disposed in front of the vehicle are mounted on side mirrors, but this is only an example.

Surround view monitoring systems, which are often used to assist in parking a vehicle, are generally directed outward of the vehicle and use a wide-angle camera to recognize objects adjacent to the vehicle. On the other hand, the 3D camera devices 510, 520, 530, and 530 are used for monitoring the outside of the vehicle instead of detecting the collision, and are more specifically arranged to provide a view on the outer surface of the vehicle door. Accordingly, the camera system 500 may provide a 3D image and a 3D video of a scratch or damage to the exterior surface of the vehicle.

In the present specification, a picture generally means a unit representing one image of a specific time zone, and a slice is a unit constituting a part of the picture in coding. One picture may consist of a plurality of slices. Optionally, the picture and the slice may be mixed with terms.

A pixel or a pel may mean a minimum unit constituting one picture (or image). Further, a 'sample' may be used as a term representing a value of a specific pixel. The sample may generally indicate a value of the pixel, may represent only a pixel value of a luma component, and may represent only a pixel value of a chroma component.

A unit indicates a basic unit of image processing. The unit may include at least one of a specific area and information related to the area. Optionally, the unit may be mixed with terms such as a block, an area, or the like. In a typical case, an MxN block may represent a set of samples or transform coefficients arranged in M columns and N rows.

Figure 6:
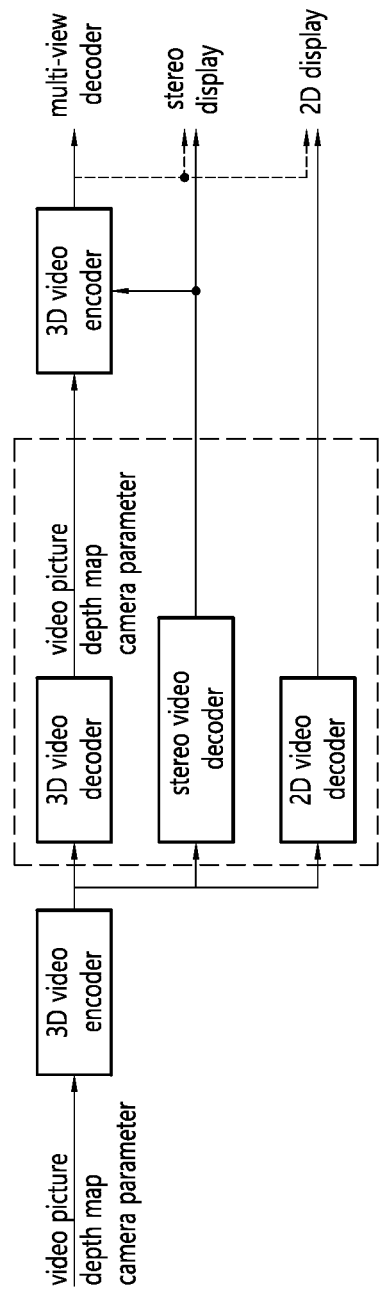
FIG. 6 illustrates 3D video encoding and decoding processes to which an embodiment of the present specification is applicable.

FIG. 6 illustrates 3D video encoding and decoding processes to which an embodiment of the present specification is applicable.

A 3D video encoder may encode a video picture, a depth map, and a camera parameter to output a bitstream. A depth map may be constructed of distance information (depth information) between a camera and a subject with respect to a picture of a corresponding video picture (texture picture). For example, the depth map may be an image obtained by normalizing depth information according to a bit depth. In this case, the depth map may be constructed of depth information recorded without a color difference representation. The depth map may be called a depth map picture or a depth picture.

In general, a distance to the subject and a disparity are inverse proportional to each other. Therefore, disparity information indicating an inter-view correlation may be derived from the depth information of the depth map by using the camera parameter.

A bitstream including the depth map and the camera parameter together with a typical color image, i.e., a video picture (texture picture), may be transmitted to a decoder through a network or a storage medium.

From a decoder side, the bitstream may be received to reconstruct a video. If a 3D video decoder is used in the decoder side, the 3D video decoder may decode the video picture, the depth map, and the camera parameter from the bitstream. Views required for a multi-view display may be synthesized on the basis of the decoded video picture, depth map, and camera parameter. In this case, if a display in use is a stereo display, a 3D image may be displayed by using pictures for two views among reconstructed multi-views.

If a stereo video decoder is used, the stereo video decoder may reconstruct two pictures to be incident to both eyes from the bitstream. In a stereo display, a stereoscopic image may be displayed by using a view difference or disparity of a left image which is incident to a left eye and a right image which is incident to a right eye. When a multi-view display is used together with the stereo video decoder, a multi-view may be displayed by generating different views on the basis of reconstructed two pictures.

If a 2D decoder is used, a 2D image may be reconstructed to output the image to a 2D display. If the 2D display is used but the 3D video decoder or the stereo video decoder is used as the decoder, one of the reconstructed images may be output to the 2D display.

A view synthesis may be performed in a decoder side or may be performed in a display side. Further, the decoder and the display may be one device or may be separate devices.

Although it is described for convenience that the 3D video decoder and the stereo video decoder and the 2D video decoder are separate decoders, one decoding device may perform all of the 3D video decoding, the stereo video decoding, and the 2D video decoding. Further, the 3D video decoding device may perform the 3D video decoding, the stereo video decoding device may perform the stereo video decoding, and the 2D video decoding device may perform the 2D video decoding. Further, the multi-view display may output the 2D video or may output the stereo video.

Figure 7:
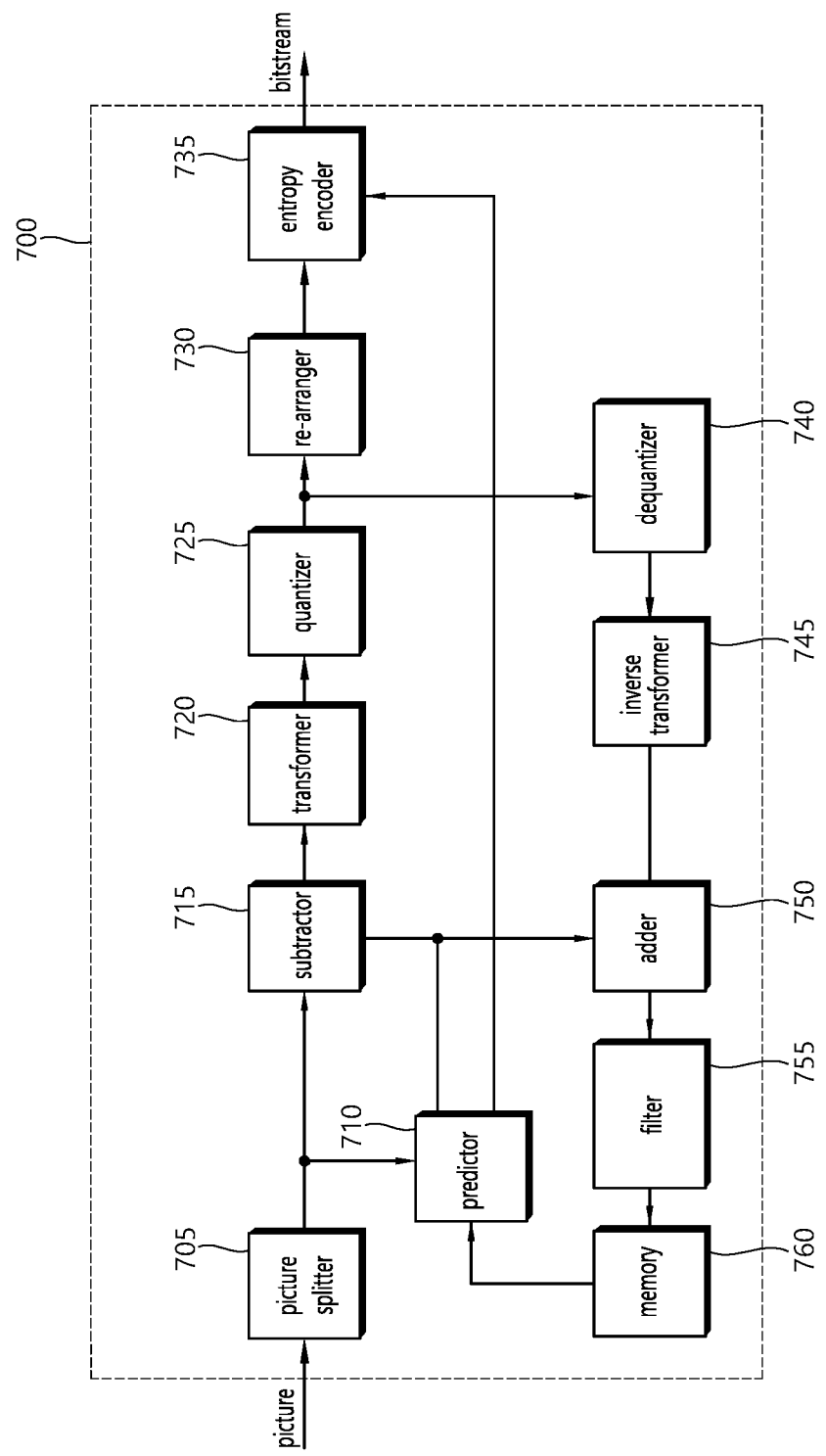
FIG. 7 illustrates a video encoder according to an embodiment of the present specification.

FIG. 7 illustrates a video encoder according to an embodiment of the present specification.

A video encoder 700 includes a picture splitter 705, a predictor 710, a subtractor 715, a transformer 720, a quantizer 725, a re-arranger 730, an entropy encoder 735, a dequantizer 740, an inverse transformer 745, an adder 750, a filter 755, and a memory 760.

The picture splitter 205 may split an input picture into at least one processing unit block. In this case, the processing unit block may be a coding unit block, a prediction unit block, or a transform unit block. As a unit block of coding, the coding unit block may be split from a largest coding unit block according to a quad-tree structure. As a block partitioned from the coding unit block, the prediction unit block may be a unit block of sample prediction. In this case, the prediction unit block may be divided into sub blocks. The transform unit block may be split from the coding unit block according to the quad-tree structure, and may be a unit block for deriving according to a transform coefficient or a unit block for deriving a residual signal from the transform coefficient.

Hereinafter, the coding unit block may be called a coding block (CB) or a coding unit (CU), the prediction unit block may be called a prediction block (PB) or a prediction unit (PU), and the transform unit block may be called a transform block (TB) or a transform unit (TU).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 710 may perform prediction on a processing target block (hereinafter, a current block), and may generate a prediction block including prediction samples for the current block. A unit of prediction performed in the predictor 710 may be a coding block, or may be a transform block, or may be a prediction block.

The predictor 710 may determine whether intra prediction is applied or inter prediction is applied to the current block. For example, the predictor 710 may determine whether the intra prediction or the inter prediction is applied in unit of CU.

In case of the intra prediction, the predictor 710 may derive a prediction sample for the current block on the basis of a reference sample outside the current block in a picture to which the current block belongs (hereinafter, a current picture). In this case, the predictor 710 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode, and the case (ii) may be called a directional mode. The predictor 710 may determine the prediction mode to be applied to the current block by using the prediction mode applied to the neighboring block.

In case of the inter prediction, the predictor 710 may derive the prediction sample for the current block on the basis of a sample specified by a motion vector on a reference picture. The predictor 710 may derive the prediction sample for the current block by applying any one of a skip mode, a merge mode, and a motion vector prediction (MVP) mode. In case of the skip mode and the merge mode, the predictor 710 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter prediction, the neighboring block includes a spatial neighboring block existing in the current picture and a temporal neighboring block existing in the reference picture. The reference picture including the temporal neighboring block may also be called a collocated picture (colPic). Motion information may include the motion vector and the reference picture. If the motion information of the temporal neighboring block is used in the skip mode and the merge mode, a top picture on a reference picture list may be used as the reference picture.

A multi-view may be divided into an independent view and a dependent view. In case of encoding for the independent view, the predictor 710 may perform not only inter prediction but also inter-view prediction.

The predictor 710 may configure the reference picture list by including pictures of different views. For the inter-view prediction, the predictor 710 may derive a disparity vector. Unlike in the motion vector which specifies a block corresponding to the current block in a different picture in the current view, the disparity vector may specify a block corresponding to the current block in another view of the same access unit (AU) as the current picture. In the multi-view, for example, the AU may include video pictures and depth maps corresponding to the same time instance. Herein, the AU may mean a set of pictures having the same picture order count (POC). The POC corresponds to a display order, and may be distinguished from a coding order.

The predictor 710 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view.

For example, the predictor 710 may add, to the merging candidate list, an inter-view merging candidate (IvMC) corresponding to temporal motion information of a reference view, an inter-view disparity vector candidate (IvDC) corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 710 may predict the motion vector of the current block on the basis of the disparity vector by applying the inter-view motion vector prediction. In this case, the predictor 710 may derive the disparity vector on the basis of a conversion of a largest depth value in a corresponding depth block. When a position of a reference sample in a reference view is specified by adding the disparity vector to a sample position of the current block in the reference view, a block including the reference sample may be used as a reference block. The predictor 210 may use the motion vector of the reference block as a candidate motion parameter of the current block or a motion vector predictor candidate, and may use the disparity vector as a candidate disparity vector for a disparity compensated prediction (DCP).

The subtractor 715 generates a residual sample which is a difference between an original sample and a prediction sample. If the skip mode is applied, the residual sample may not be generated as described above.

The transformer 720 transforms a residual sample in unit of a transform block to generate a transform coefficient. The quantizer 725 may quantize the transform coefficients to generate a quantized transform coefficient.

The re-arranger 730 re-arranges the quantized transform coefficients. The re-arranger 730 may re-arrange the quantized transform coefficients having a block shape in a 1D vector form by using a scanning method.

The entropy encoder 735 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 735 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The adder 750 adds the residual sample and the prediction sample to reconstruct the picture. The residual sample and the prediction sample may be added in unit of blocks to generate a reconstruction block. Although it is described herein that the adder 750 is configured separately, the adder 750 may be a part of the predictor 710.

The filter 755 may apply deblocking filtering and/or a sample adaptive offset to the reconstructed picture. An artifact of a block boundary in the reconstructed picture or a distortion in a quantization process may be corrected through the deblocking filtering and/or the sample adaptive offset. The sample adaptive offset may be applied in unit of samples, and may be applied after a process of the deblocking filtering is complete.

The memory 760 may store the reconstructed picture or information required for encoding/decoding. For example, the memory 760 may store (reference) pictures used in inter prediction/inter-view prediction. In this case, pictures used in the inter prediction/inter-view prediction may be designated by a reference picture set or a reference picture list.

Although it is described herein that one encoder encodes an independent view and a dependent view, this is for convenience of explanation. Thus, a separate encoder may be configured for each view, or a separate internal module (e.g., a prediction module for each view) may be configured for each view.

Figure 8:
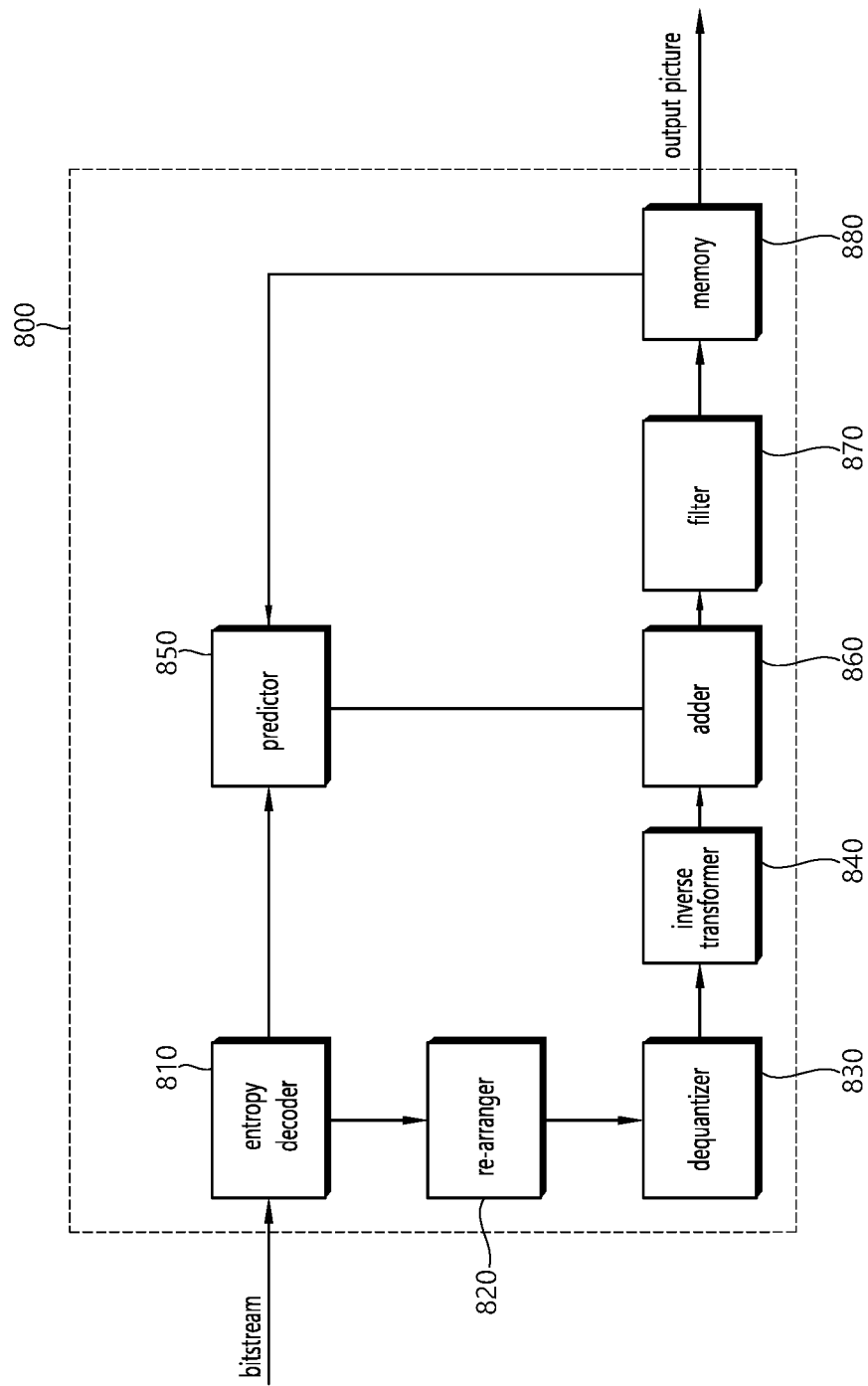
FIG. 8 illustrates a video decoder according to an embodiment of the present specification.

FIG. 8 illustrates a video decoder according to an embodiment of the present specification.

A video decoder 800 includes an entropy decoder 810, a re-arranger 820, a dequantizer 830, an inverse transformer 840, a predictor 850, an adder 860, a filter 870, and a memory 880. When a bitstream including video information is input, the video decoder 800 may reconstruct a video in association with a process by which video information is processed in the video encoding device.

For example, the video decoder 800 may perform video decoding by using a processing unit applied in the video encoder. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 810 may parse the bitstream to output information required for video reconstruction or picture reconstruction. For example, the entropy decoder 810 may decode information in the bitstream on the basis of a coding method such as exponential Golomb encoding, CAVLC, CABAC, or the like, and may output a value of a syntax element required for video reconstruction and a quantized value of a transform coefficient regarding a residual.

If a plurality of views are processed to reproduce a 3D video, the bitstream may be input for each view. Alternatively, information regarding each view may be multiplexed in the bitstream. In this case, the entropy decoder 810 may de-multiplex the bitstream to parse it for each view.

The re-arranger 820 may re-arrange quantized transform coefficients in a form of a 2D block. The re-arranger 820 may perform re-arrangement in association with coefficient scanning performed in an encoding device.

The dequantizer 830 may de-quantize the quantized transform coefficients on the basis of a (de)quantization parameter to output a transform coefficient. In this case, information for deriving a quantization parameter may be signaled from the encoding device.

The inverse transformer 840 may inverse-transform the transform coefficients to derive residual samples.

The predictor 850 may perform prediction on a current block, and may generate a prediction block including prediction samples for the current block. A unit of prediction performed in the predictor 850 may be a coding block or may be a transform block or may be a prediction block.

The predictor 850 may determine whether to apply intra prediction or inter prediction. In this case, a unit for determining which one will be used between the intra prediction and the inter prediction may be different from a unit for generating a prediction sample. In addition, a unit for generating the prediction sample may also be different in the inter prediction and the intra prediction. For example, which one will be applied between the inter prediction and the intra prediction may be determined in unit of CU. Further, for example, in the inter prediction, the prediction sample may be generated by determining the prediction mode in unit of PU, and in the intra prediction, the prediction sample may be generated in unit of TU by determining the prediction mode in unit of PU.

In case of the intra prediction, the predictor 850 may derive a prediction sample for a current block on the basis of a neighboring reference sample in a current picture. The predictor 850 may derive the prediction sample for the current block by applying a directional mode or a non-directional mode on the basis of the neighboring reference sample of the current block. In this case, a prediction mode to be applied to the current block may be determined by using an intra prediction mode of a neighboring block.

In case of the inter prediction, the predictor 850 may derive the prediction sample for the current block on the basis of a sample specified on a reference picture by a motion vector on the reference picture. The predictor 850 may derive the prediction sample for the current block by applying any one of a skip mode, a merge mode, and an MVP mode.

In case of the skip mode and the merge mode, motion information of the neighboring block may be used as motion information of the current block. In this case, the neighboring block may include a spatial neighboring block and a temporal neighboring block.

The predictor 850 may construct a merging candidate list by using motion information of an available neighboring block, and may use information indicated by a merge index on the merging candidate list as a motion vector of the current block. The merge index may be signaled from the encoding device. The motion information may include the motion vector and the reference picture. When motion information of the temporal neighboring block is used in the skip mode and the merge mode, a highest picture on the reference picture list may be used as the reference picture.

In case of the skip mode, unlike in the merge mode, a difference (residual) between the prediction sample and the original sample is not transmitted.

In case of the MVP mode, the motion vector of the current block may be derived by using the motion vector of the neighboring block as a motion vector predictor. In this case, the neighboring block may include a spatial neighboring block and a temporal neighboring block.

In case of the dependent view, the predictor 850 may perform inter-view prediction. In this case, the predictor 850 may configure the reference picture list by including pictures of different views.

For the inter-view prediction, the predictor 850 may derive a disparity vector. The predictor 850 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view. The camera parameter may be signaled from the encoding device.

When the merge mode is applied to the current block of the dependent view, the predictor 850 may add, to the merging candidate list, an IvMC corresponding to temporal motion information of a reference view, an IvDC corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 850 may predict the motion vector of the current block on the basis of the disparity vector by applying the inter-view motion vector prediction. In this case, the predictor 850 may use a block in a reference view specified by the disparity vector as a reference block. The predictor 850 may use the motion vector of the reference block as a candidate motion parameter or a motion vector predictor candidate of the current block, and may use the disparity vector as a candidate vector for disparity compensated prediction (DCP).

The adder 860 may add the residual sample and the prediction sample to reconstruct the current block or the current picture. The adder 860 may add the residual sample and the prediction sample in unit of blocks to reconstruct the current picture. When the skip mode is applied, a residual is not transmitted, and thus the prediction sample may be a reconstruction sample. Although it is described herein that the adder 860 is configured separately, the adder 860 may be a part of the predictor 850.

The filter 870 may apply de-blocking filtering and/or a sample adaptive offset to the reconstructed picture. In this case, the sample adaptive offset may be applied in unit of samples, and may be applied after de-blocking filtering.

The memory 880 may store a reconstructed picture and information required in decoding. For example, the memory 380 may store pictures used in inter prediction/inter-view prediction. In this case, pictures used in the inter prediction/inter-view prediction may be designated by a reference picture set or a reference picture list. The reconstructed picture may be used as a reference picture for a different picture.

Further, the memory 880 may output the reconstructed picture according to an output order. Although not shown, an output unit may display a plurality of different views to reproduce a 3D image.

Although it is described that an independent view and a dependent view are decoded in one decoder, this is for exemplary purposes only, and the present invention is not limited thereto. For example, each decoding device may operate for each view, and an internal module (for example, a prediction module) may be provided in association with each view in one decoding device.

Multi-view video coding may perform coding on a current picture by using decoding data of a different view belonging to the same access unit (AU) as the current picture to increase video coding efficiency for the current view.

In the multi-view video decoding, views may be coded in unit of AU, and pictures may be coded in unit of views. Coding is performed between views according to a determined order. A view which can be coded without a reference of another view may be called a base view or an independent view. Further, a view which can be coded with reference to an independent view or another view after the independent view is coded may be called a dependent view or an extended view. Further, if the current view is a dependent view, a view used as a reference in coding of the current view may be called a reference view. Herein, coding of a view includes coding of a video picture, a depth map, or the like belonging to the view.

A 3D video includes a video picture (or a texture picture) having typical color image information and a depth map having depth information regarding a video picture. In the 3D video, a plurality of video pictures having different time instances may be present in the same POC, and a depth map corresponding to each of the plurality of video pictures may be present. Further, the plurality of video pictures may be acquired from a plurality of cameras having different time instances.

The 3D video may be represented as a multi-view video plus depth format. In the encoding device, several captured views and related depth maps are coded, and resulting bitstream packets may be multiplexed into a 3D video bitstream. In the decoding device, data regarding a video picture and a depth map is decoded, and if necessary, an additional intermediate view may be synthesized by using a depth-image-based rendering (DIBR) scheme. For the view synthesis, a camera parameter may be additionally included in the bitstream. The camera parameter may include $Z_{Far}$, $Z_{near}$, a focal length, etc.

Figure 9:
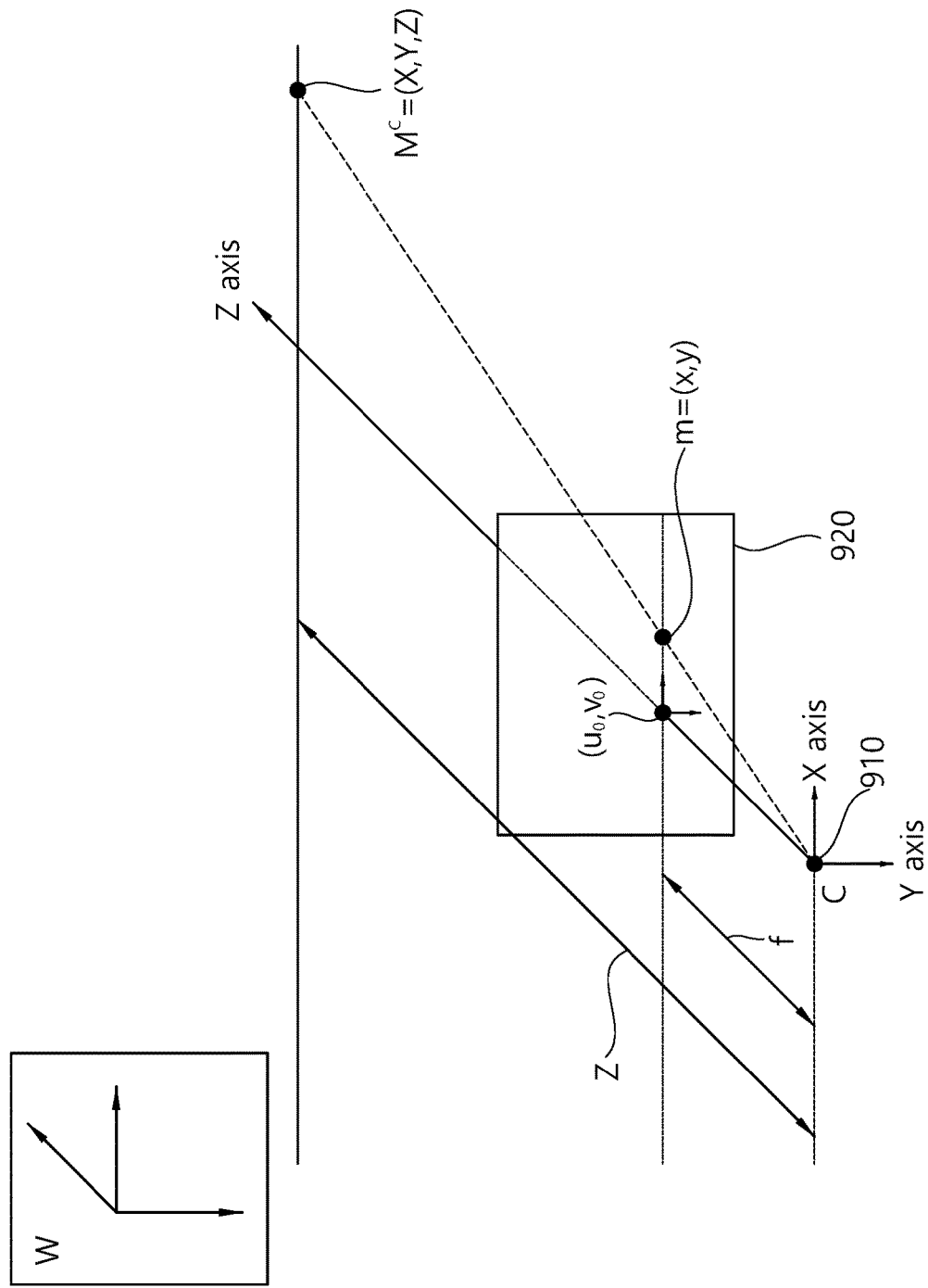
FIGS. 9 and 10 illustrate a camera parameter that can be used in the present embodiments.
Figure 10:
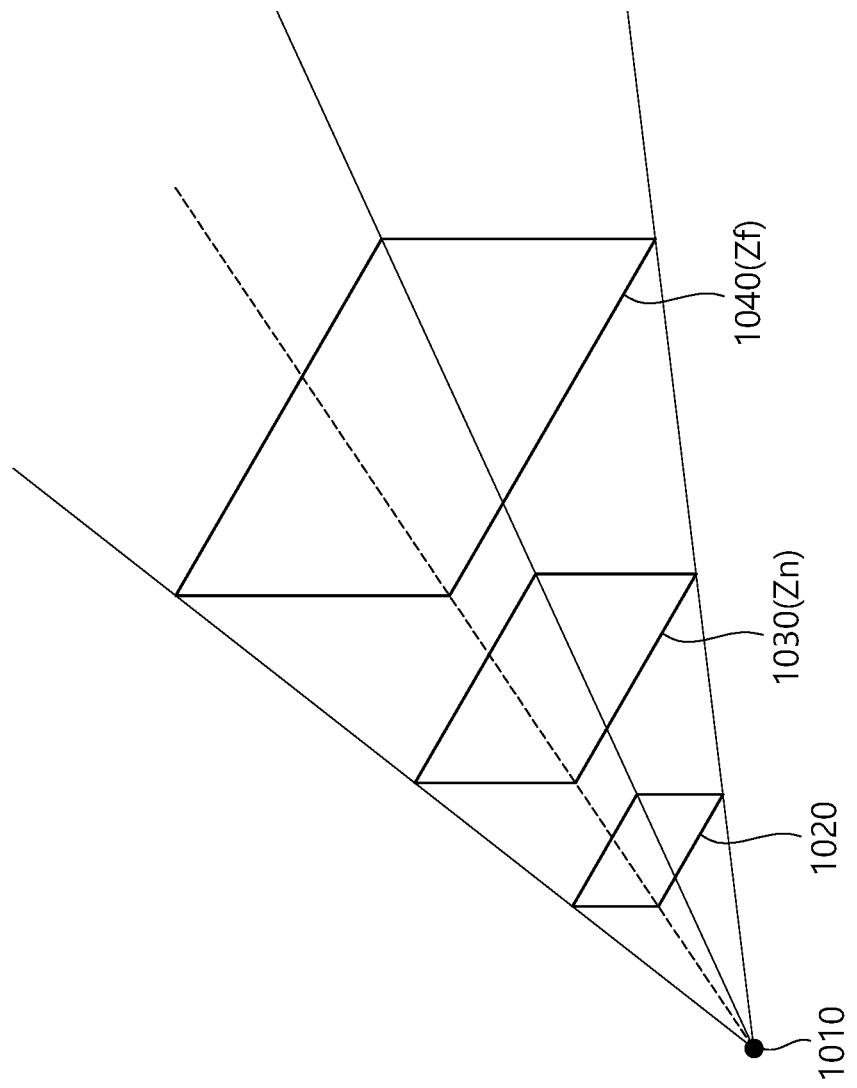

FIGS. 9 and 10 illustrate a camera parameter that can be used in the present embodiments. Camera parameter may be used to synthesize a reference picture used for VSP, and may also be used by a decoder to generate an intermediary time instance image. Accordingly, an encoder may encode the camera parameter for each time instance to transmit it to the decoder through a network or a storage medium.

Referring to FIG. 9, a coordinate system indicated by W may refer to 'reference coordinate system' used to designate a position of a camera on a space. Further, a coordinate system indicated by C may refer to 'camera coordinate system' which has a focal point 910 of a camera corresponding to camera parameters as an origin. Furthermore, an image plane 920 denotes an image plane which displays an image acquired by the camera.

'f' indicates a distance from the focal point 910 of the camera to the image plane 920 (a distance on a z-axis), that is, a focal length. Further, $(u_0, v_0)$ may indicate a coordinate of a point at which an optical axis of the camera meets the image plane 920, that is, a coordinate of a principal point. The optical axis may imply a vertical coordinate axis of the image plane 920 in the camera coordinate system, and is shown as the z-axis in FIG. 9. Therefore, a distance from the focal point 910 of the camera to the principal point may correspond to the focal length. The aforementioned three parameters (f, $u_0$, $v_0$) may be called an intrinsic camera parameter.

Meanwhile, the camera parameter may be a 3×3 rotation matrix R and 3×1 translation vector T used to indicate a camera coordinate system C with respect to the reference coordinate system W. Herein, the 3×3 rotation matrix R indicates a rotation degree by which the camera coordinate system rotates on a 3D space with respect to the reference coordinate system. That is, the 3×3 rotation matrix R indicates a 3D rotation of the camera coordinate system with respect to the reference coordinate system. Further, the 3×1 translation vector T is a vector indicating a position of the camera coordinate system with respect to the reference coordinate system. The 3×3 rotation matrix R and the 3×1 translation vector T may indicate a geometric relation of the reference coordinate system and the camera coordinate system. Accordingly, the two parameters may be called an extrinsic camera parameter.

FIG. 10 illustrates three planes orthogonal to an optical axis of a camera. A reference numeral 1010 denotes a focal point of the camera, that is, an origin of a camera coordinate system, and a reference numeral 1020 denotes an image plane.

A scene captured by one camera may have various depth values. In this case, a point having a smallest depth value may be a point which is closest in distance to the camera, and a point having a greatest depth value may be a point which is farthest in distance from the camera. An image plane 1030 of FIG. 10 denotes a plane corresponding to the smallest depth value in the scene captured by the camera having the focal point 1010, and may be called a near clipping plane. Further, an image plane 1040 denotes a plane corresponding to the greatest depth value in the scene captured by the camera having the focal point 11010, and may be called a far clipping plane.

In any scene captured by one camera, the smallest depth value may be indicated by $Z_{near}(Z_n)$, and may correspond to a depth value of the near clipping plane 1030. The greatest depth value may be indicated by $Z_{far}(Z_f)$, and may correspond to a depth value of the far clipping plane 1040. The values $Z_{near}$ and $Z_{far}$ correspond to camera parameters, and may be called Z-clipping parameters.

Depth data processed in an encoder and transmitted to a decoder may have a value based on a bit depth. For example, if the bit depth is 8, depth sample values in a depth map may have a value in the range of 0 to 255. In this case, the depth sample values may correspond to depth values in the range of Z-clipping parameters $Z_{near}$ and $Z_{far}$. Accordingly, the quantized depth sample values may be transformed to real depth values on the basis of the Z-clipping parameters $Z_{near}$ and $Z_{far}$.

In addition, a camera parameter may be used to convert the depth value into the disparity value also in VSP which performs prediction on a current picture (or block) by using a picture of a view synthesized on the basis of DIBR as a reference picture and in a depth refinement or the like performed on a disparity vector candidate on the basis of a corresponding depth block. The camera parameter for such a conversion may be called a conversion parameter, and may be used to configure a depth-to-disparity table. The camera parameters required to convert the depth value into the disparity value may be included in a bitstream, and the camera parameter (or conversion parameter) may include parameters regarding a scale factor and an offset.

In the following embodiments, a camera parameter may include a plurality of parameters, and may be referred to as a camera parameter set. The camera parameter may be shared or modified between pictures of a view over time. For example, when the position of the camera is fixed or the relative position between the multi-view cameras does not change until the 3D video is finished, each picture of the view may share one camera parameter. In this case, the camera parameter representing the view may be transmitted through a video parameter set (VPS) syntax.

Figure 11:
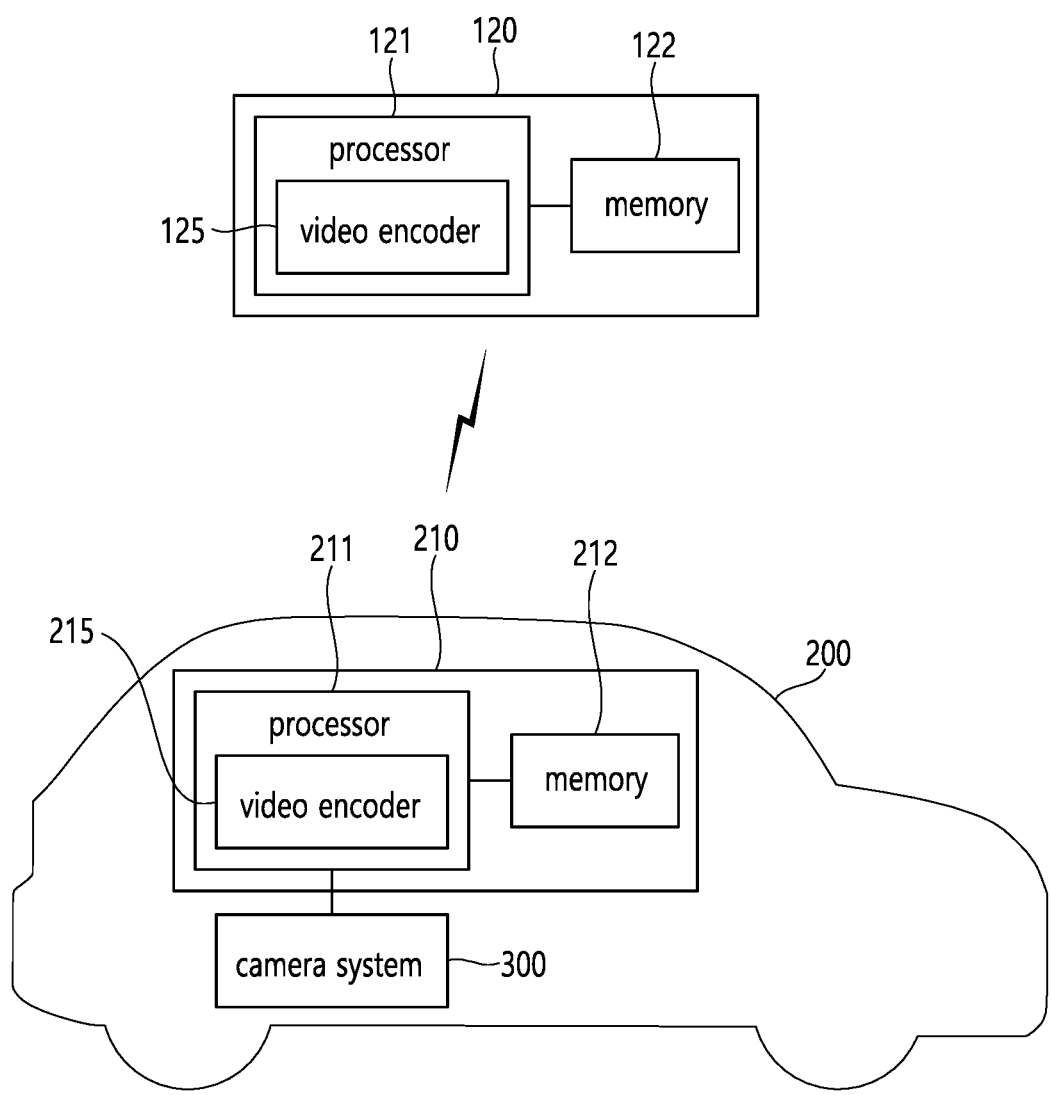
FIG. 11 is a block diagram illustrating a vehicle and a server to which 3D video is applied according to an embodiment of the present specification.

FIG. 11 is a block diagram illustrating a vehicle and a server to which 3D video is applied according to an embodiment of the present specification.

An MEC server 120 includes a processor 121 and a memory 122. The memory 122 stores instructions for performing a function of the server 120. The processor 121 executes an instruction to perform a function of the server 120. The video decoder 125 is exemplified to be disposed as a module in the processor 121, but this is not a limitation. The video decoder 125 may implement the function of the video decoder 800 of FIG. 8. The video decoder 125 may be implemented as a separate circuit or chip.

A control device 210 of the vehicle 200 includes a processor 211 and a memory 212. The memory 212 stores instructions for performing a function of the control device 210. The processor 211 executes a command to perform a function of the control device 210. The video encoder 215 may implement the functions of the video encoder 700 of FIG. 7. The video encoder 215 is illustrated as being disposed as a module in the processor 211, but this is not a limitation. The video encoder 215 may be implemented as a separate circuit or chip.

The control device 210 may receive a 3D video from the camera system 300 and allow the vehicle to perform various operations. The control device 210 may control the camera system 300. The control device 300 may communicate with the server 120 and/or a user (e.g., a vehicle owner, a registered user, etc.) using a wireless communication network. The control device 210 may instruct the camera system 300 to start/stop/restart 3D video recording.

The control device 210 may monitor whether an emergency event occurs in the vehicle 200. The control device 210 may detect whether an emergency event occurs based on an input from a passenger (e.g., turning on an emergency switch, etc.) or a sensor input from a sensing device. When an emergency event is detected, the control device 210 may transmit the detection to the MEC server 120.

The MEC server 120 may receive the 3D video and the occurrence of the emergency event from the vehicle 200. The MEC server 120 may transmit the occurrence of an emergency event to an emergency center or a user. When the occurrence of an emergency event is detected, the MEC server 120 may assign a high priority to the 3D video received from the corresponding vehicle. For example, the MEC server 120 may allocate a wider bandwidth or a higher channel access priority to the vehicle.

3D video including video from a plurality of cameras has a large capacity, and may cause a delay in transmission from the vehicle 200 to the MEC server 120 in real time. In order to reduce the delay, the control device 210 may transmit information about the camera parameter set of the camera system 300 to the MEC server 120 in advance while the vehicle is driving. The camera parameter set may include at least one of an internal camera parameter, an external camera parameter, and a conversion parameter. The position of the camera system 300 in the vehicle 200 is fixed. The camera parameter set may have fixed values, and the MEC server 120 decodes the received 3D video based on the previously received camera parameter set. Therefore, the decoding processing time is reduced, and radio resources required to transmit the camera parameter set can also be reduced.

When the vehicle 200 enters an area managed by the MEC server 120, camera parameter set information may be transmitted. When the MEC server 120 notifies the vehicle 200 that the vehicle 200 enters its own area, the vehicle 200 may transmit the camera parameter set information. Alternatively, the vehicle 200 may periodically transmit the camera parameter set information.

The camera parameter set of the camera system 300 is not changed once the setting is completed. This is because the positions of the cameras in the vehicle 200 are not easily changed. However, due to a collision, some of the cameras may not work, or one of the values in the camera parameter set may change. When at least one value in the camera parameter set is changed, the control device 210 may determine that the emergency event is detected. The control device 210 may encode the 3D video based on the unchanged value in the camera parameter set and transmit it to the MEC server 120.

Figure 12:
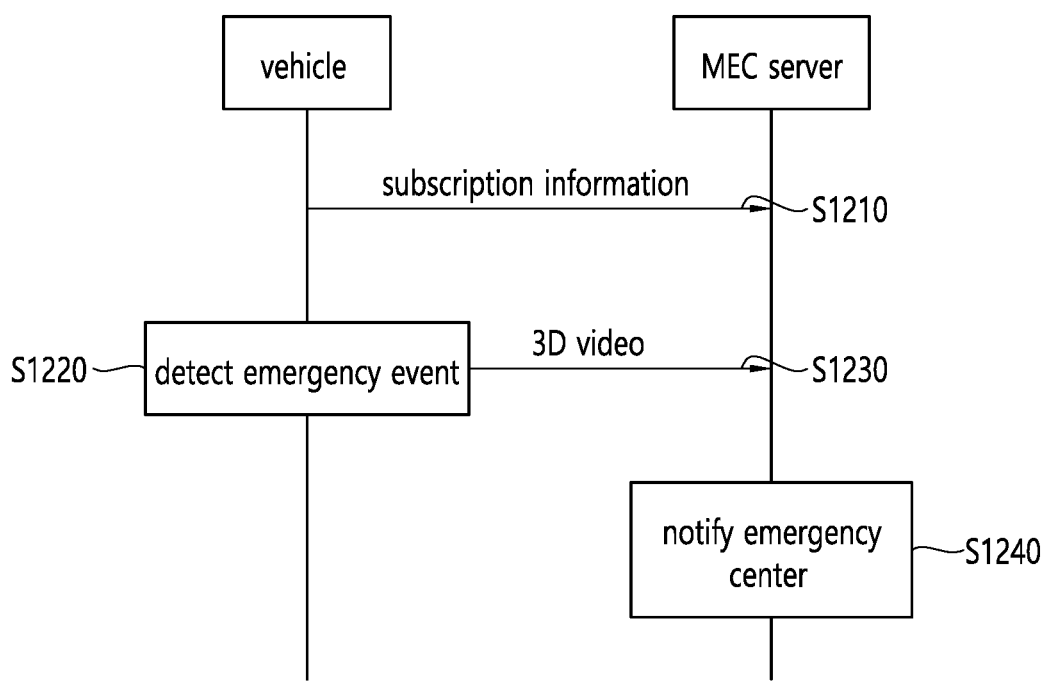
FIG. 12 is a flowchart illustrating a method of handling an emergency situation of a vehicle according to an embodiment of the present specification.

FIG. 12 is a flowchart illustrating a method of handling an emergency situation of a vehicle according to an embodiment of the present specification. The operation of a vehicle may be performed by a control device.

In step S1210, a vehicle transmits subscription information to an MEC server. The subscription information may include information informing the MEC server to provide information on an emergency event. The subscription information may include an identifier of the vehicle. The subscription information may include the above-described camera parameter set information. When the vehicle enters an area managed by the MEC server, subscription information may be transmitted. When the MEC server notifies the vehicle to enter its area, the vehicle may transmit the subscription information. Alternatively, the vehicle may periodically transmit the subscription information.

In step S1220, the vehicle monitors the occurrence of an emergency event. The vehicle may detect whether an emergency event occurs based on an input from a passenger (e.g., turning on an emergency switch, etc.) or a sensor input from a sensing device.

The vehicle may determine that the emergency event is detected when at least one value in the camera parameter set is changed. The vehicle can encode the 3D video based on the unchanged values in the camera parameter set and send it to the MEC server.

In step S1230, when an emergency event is detected, the vehicle may transmit the detection of the emergency event to the MEC server 120. In addition to or separately from the detection, the vehicle may provide a 3D video of the emergency event to the MEC server. 3D video may be encoded based on a previously provided set of camera parameters. The 3D video may be recorded from the time the emergency event occurred. Alternatively, the 3D video may be continuously recorded while the vehicle is driving, and the 3D video recorded before the emergency event may be provided. The MEC server can adjust the bandwidth or channel access so that the 3D video about the emergency event has a high priority.

In step S1240, the MEC server may transmit some or all of the received 3D video to an emergency center or a registered user's mobile device. An operator of the emergency center or the registered user can determine an emergency event occurring in a vehicle through video views from various viewpoints based on 3D video and contact an emergency responder. The emergency responder may include a police station, an ambulance, and the like.

Figure 13:
FIG. 13 shows an example in which an emergency event of a vehicle is detected.
Figure 13:
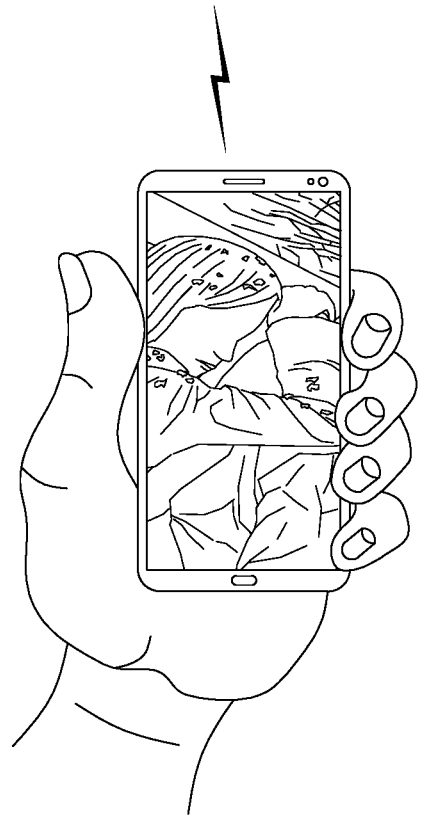

FIG. 13 shows an example in which an emergency event of a vehicle is detected.

When an emergency event such as a vehicle collision is detected, a vehicle sends a 3D video about the current state to the user's mobile device through the MEC server. A user can determine an emergency event occurring in a vehicle through a video view from various viewpoints based on 3D video and contact an emergency responder.

When an emergency event occurs in a vehicle, a 3D video can be provided to an emergency center or a user to remotely check the status of the emergency event. By sharing information about the camera parameter set between the server and the vehicle in advance, the delay in video transmission can be reduced.

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A device for handling an emergency situation in a vehicle, the device comprising:
   a control device mounted on the vehicle; and;
   a camera system for providing a 3D video regarding an interior of the vehicle to the control device and comprising a plurality of 3D camera devices, each of the plurality of 3D camera devices including a plurality of camera,
   wherein the control device is configured to:
   transmit, to a Mobile Edge Computing (MEC) server, information about a camera parameter set for the camera system while the vehicle is driving; and
   when an emergency event related to the vehicle is detected, transmit, to the MEC server, the detection of the emergency event and a 3D video encoded based on the camera parameter set provided by the camera system.

2. The device of claim 1, wherein the camera parameter set includes a camera parameter for converting a depth value into a disparity value.

3. The device of claim 1, wherein the camera parameter set includes parameters representing a focal length of at least one camera and a geometric relationship between a reference coordinate system and a camera coordinate system.

4. The device of claim 1, wherein the control device is configured to transmit information about the camera parameter set when the vehicle enters an area managed by the MEC server.

5. The device of claim 1, wherein the control device is configured to determines that the emergency event is detected when at least one value in the camera parameter set is changed.

6. The device of claim 5, wherein the control device is configured to encode the 3D video based on at least one unchanged value in the camera parameter.

7. The device of claim 1, wherein cameras in each 3D camera device have overlapped field of views (FOVs) to form a stereoscopic FOV.

8. A method for handling an emergency situation in a vehicle, the method performed by a control device of the vehicle and comprising:
   transmitting, to a Mobile Edge Computing (MEC) server, information about a camera parameter set for a camera system while the vehicle is driving, the camera system for providing a 3D video regarding an interior of the vehicle to the control device and comprising a plurality of 3D camera devices, each of the plurality of 3D camera devices including a plurality of camera; and
   when an emergency event related to the vehicle is detected, transmitting, to the MEC server, the detection of the emergency event and a 3D video encoded based on the camera parameter set provided by the camera system.

9. The method of claim 8, wherein the camera parameter set includes a camera parameter for converting a depth value into a disparity value.

10. The method of claim 8, wherein the camera parameter set includes parameters representing a focal length of at least one camera and a geometric relationship between a reference coordinate system and a camera coordinate system.

11. The method of claim 8, wherein the information about the camera parameter set is transmitted when the vehicle enters an area managed by the MEC server.

12. The method of claim 8, wherein the emergency event is detected when at least one value in the camera parameter set is changed.

13. The method of claim 12, wherein the 3D video is encoded based on at least one unchanged value in the camera parameter.

14. The method of claim 8, wherein cameras in each 3D camera device have overlapped field of views (FOVs) to form a stereoscopic FOV.

* * * * *